Figure 1:
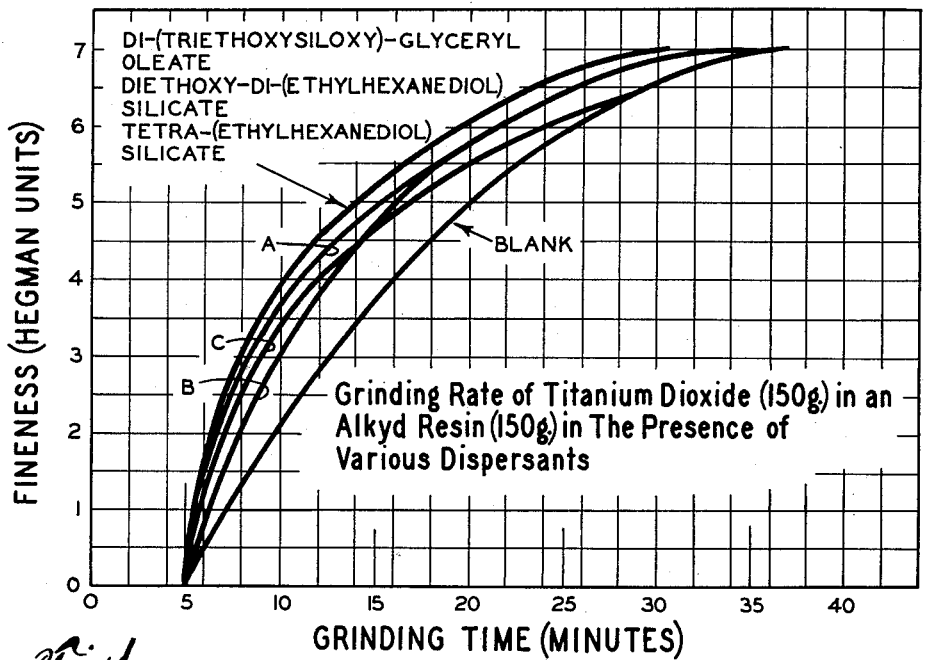

INVENTORS
JAMES O. KOEHLER
HEADLEE LAMPREY
BY
ATTORNEY

United States Patent Office 2,989,412
Patented June 20, 1961

2,989,412
ORGANOMETALLIC PIGMENT DISPERSANTS BASED ON ACYLATES POLYHYDRIC ALCOHOLATES AND AMINOALCOHOLATES OF GROUP IV-B METALS
James O. Koehler, Parma, and Headlee Lamprey, Lakewood, Ohio, assignors to Union Carbide Corporation, a corporation of New York
Filed Apr. 17, 1956, Ser. No. 578,782
5 Claims. (Cl. 106—236)

This invention relates to new and useful compositions of matter. It is concerned most specifically with their ability to rapidly and finely divide pigments in paint, varnish and ink compositions.

For some time the beneficial results capable of being attained by the addition of certain paint dispersants have been well established. Such components are known to reduce to some extent the time required to disperse inorganic pigments such as titanium dioxide in given vehicles. When used with synthetic organic pigments, these compounds, however, have less effect. The unsolved dispersion problem limits the effective use of many such pigments.

With a view to overcoming the above-indicated limitations of prior art, the present invention has for its main object the provision of new dispersants and grinding aids capable of effecting more rapid and finer dispersions of pigments than heretofore possible.

The dispersants covered by the invention may be characterized as organo metallic derivatives of certain metals of group IV of the periodic table; namely silicon, tin and lead. These compounds fall into three general classes:

(1) Metal carboxylates having the formula

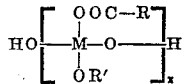

wherein M represents silicon, tin or lead; R is an aryl, alkaryl, aralkyl, alkyl or substituted alkyl group having from 10 to 18 carbon atoms; R' is an aryl, alkaryl, aralkyl, alkyl or substituted alkyl group having from 1 to 18 carbon atoms; and $x$ is a small integer.

(2) Metal aminoalcohol derivatives having the formula $(RO)_xM[OC_2H_4N(R')_2]_{4-x}\cdot(HO_2C-R'')_y$ wherein M represents silicon, tin or lead, R and R' are aryl, alkaryl, aralkyl, alkyl or haloalkyl groups having from 1 to 18 carbon atoms, R'' is an alkyl or a substituted alkyl group having from 10 to 18 carbon atoms, $x$ may be from 0 to 3, and $y$ equal to or less than $(4-x)$.

(3) Metal polyhydric alcohol derivatives having the formulas

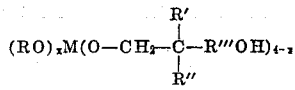

for example

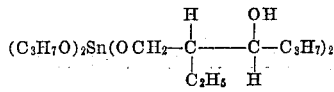

wherein M represents silicon, tin or lead, R is an aryl, aralkyl, alkaryl or alkyl group having from 1 to 18 carbon atoms, R' is H, OH or an alkyl or substituted alkyl radical, R'' is H or an alkyl or substituted alkyl, R''' is an alkylene or substituted alkylene radical and $x$ is a number from 1 to 3.

The polymeric chain length is affected by the following factors:

(1) Heating—generally the longer the heating cycle, the longer the chain.

(2) The amount of water added affects the chain length, in that the greater the quantity of water added, the longer the polymer. Too much water, however, results in cross linking, and in the formation of insoluble products.

(3) In the case of carboxylates, if two mols of carboxylic acid are used per mol of orthoester, a longer chain polymer results. If, however, only one mol of acid per mol of orthoester is used, a short-chain polymer results.

The dispersants of the present invention have a marked effect on the properties of pigment-containing systems when present in such systems in an amount ranging from as little as 0.1 percent to several percent of the total system weight. A suitable range found operative for various pigment types is from 0.5 percent to about 2.0 percent.

These dispersant compounds may be prepared by either of two general procedures. A preferred method consists of a transesterification reaction between an orthoester of the appropriate metal and the desired alcohol and acid. An alternative procedure is the reaction of metal halides with the appropriate alcohols and acid, followed by hydrolysis and polymerization.

The preparative methods of the invention are further illustrated by the following examples, in which the amounts of reactants are expressed in parts by weight unless otherwise indicated.

EXAMPLE 1

*Preparation of isopropoxy dichlorosilane oleate polymer*

38.7 grams (0.2 mol) of isopropoxy trichlorosilane and 56.5 grams (0.2 mol) of oleic acid were stirred and refluxed at 100° C. until evolution of hydrogen chloride ceased. During the reaction, which required about three hours, dry nitrogen was passed through the system to sweep out the effluent hydrogen chloride. The solution was cooled, and a 10 percent excess of sodium bicarbonate was added in small portions to hydrolyze the isopropoxy dichlorosilicon monomer. After the last portion of sodium bicarbonate had been added, the mixture was again refluxed for one hour, cooled and filtered through a pressure filter. The solvent was removed under reduced pressure. The collected product, isopropoxy dichlorosilane oleate polymer, was obtained as a dark red oil, which was soluble in hexane and carbon tetrachloride, but insoluble in ethyl alcohol and water.

EXAMPLE 2

*Preparation of butoxy stearoxy polysilicate*

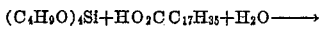

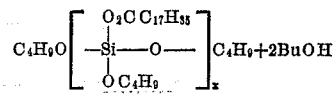

One hundred twenty-eight grams (0.4 mol) of n-butyl orthosilicate and 228 grams (0.4 mol) of stearic acid were heated at 50° C. to 60° C. until the acid dissolved. The solution was cooled to room temperature and 7.2 grams (0.4 mol) of water containing 0.5 mol of concentrated HCl were added dropwise to the agitated mixture. After the last of the water was added, the mixture was refluxed at 80° C. under a vacuum of 2 mm. until the distillation of n-butanol ceased. The vacuum was then broken, and the product cooled to room temperature. A cream-colored, waxy solid was obtained having the following analysis:

|  | Calculated | Found |
|---|---|---|
| Percent Si | 6.95 | 6.81 / 6.82 |
| Formula weight | 400 | 1189 |

From the value found by analysis of the compound it appears to be a trimer.

EXAMPLE 3

*Alternative preparation of butoxy stearoxy polysilicate*

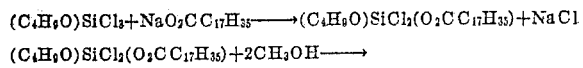

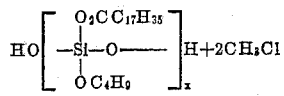

Forty-one and eight-tenth grams (0.2 mol) of butoxy trichlorosilane was stirred in 200 mls. of dry benzene. To the stirred solution were added 61.2 grams (0.2 mol) of sodium stearate in 10 gram portions over a period of one-half hour. The mixture was then refluxed for one-half hour, and cooled to room temperature. The mixture was again stirred, and 19.2 grams (0.6 mol) of dry methanol were added dropwise over a period of one-half hour. The mixture was heated to reflux and stirred for one-half hour longer. The solution was cooled, filtered and the filter cake washed with 250 ml. portions of hot benzene. The filtrate and the washings were vacuum-stripped to remove benzene and excess methanol. The product, a tan colored solid, had the following analysis:

|  | Calculated | Found |
|---|---|---|
| Percent Si | 6.95 | 6.73 / 6.76 |

Examples four to 14 inclusive consist of similar compounds prepared in the manner indicated above. Their average physical properties are given in Table I below. It is to be noted that here, as in the case of all the compounds of the subject invention, these properties depend upon the degree of polymerization, method of preparation and purity of the given compound.

TABLE I

| No. | Compound | Appearance | M.P. | Solubility in | | | |
|---|---|---|---|---|---|---|---|
| | | | | Hexane | CCl$_4$ | C$_2$H$_5$OH | H$_2$O |
| 4 | Isopropoxy Stearoxy Polysilicate $HO\left[\begin{array}{c}O_2C-C_{17}H_{35}\\ -Si-O-\\ OC_3H_7\end{array}\right]_x H$ | wax | 53° C. | sol | sol | Insol | Insol. |
| 5 | Isopropoxy Perfluorobutyryl Polysilicate $HO\left[\begin{array}{c}O_2C-C_3F_7\\ -Si-O-\\ OC_3H_7\end{array}\right]_x H$ | liquid | | sol | sol | Insol | Dec. |
| 6 | Isopropoxy Perfluoroacetoxy Polysilicate $HO\left[\begin{array}{c}O_2C-CF_3\\ -Si-O-\\ OC_3H_7\end{array}\right]_x H$ | liquid | | sol | sol | Insol | Dec. |
| 7 | Isopropoxy Stearoxy Polystannate $HO\left[\begin{array}{c}O_2C-C_{17}H_{35}\\ -Sn-O-\\ OC_3H_7\end{array}\right]_x H$ | wax | 48° C. | sol | sol | Insol | Dec. |
| 8 | Isopropoxy Oleoxy Polystannate $HO\left[\begin{array}{c}O_2C-C_{17}H_{33}\\ -Sn-O-\\ OC_3H_7\end{array}\right]_x H$ | liquid | | sol | sol | Insol | Insol. |
| 9 | Isopropoxy 9,10-Dibromostearoxy Polysilicate $HO\left[\begin{array}{c}O_2C-(CH_2)_8-CH-CH-(CH_2)_8-CH_3\\ \ \ \ \ \ \ \ \ \ \ \ \ \ \ \ \ \ \ \ \ \ Br\ \ Br\\ -Si-O-\\ OC_3H_7\end{array}\right]_x H$ | liquid | | sol | sol | Insol | Dec. |
| 10 | Isopropoxy 10-Hydroxystearoxy Polysilicate $HO\left[\begin{array}{c}O_2C-(CH_2)_9-CH(CH_2)_6-CH_3\\ \ \ \ \ \ \ \ \ \ \ \ \ \ \ \ \ \ \ \ OH\\ -Si-O-\\ OC_3H_7\end{array}\right]_x H$ | liquid | | sol | sol | Insol | Insol. |
| 11 | Isopropoxy Benzoxy Polysilicate $HO\left[\begin{array}{c}O_2C-C_6H_5\\ -Si-O-\\ OC_3H_7\end{array}\right]_x H$ | liquid | | sol | sol | s.sol | Insol. |

TABLE I—Continued

| No. | Compound | Appearance | M.P. | Solubility in | | | |
|---|---|---|---|---|---|---|---|
| | | | | Hexane | CCl$_4$ | C$_2$H$_5$OH | H$_2$O |
| 12 | Methyl Perfluorobutyryl Polysilicate $$HO\left[\begin{array}{c}O_2C-C_3F_7\\|\\-Si-O-\\|\\CH_3\end{array}\right]_xH$$ | solid | 52°C | sol | sol | Insol | Insol |
| 13 | Butoxy Oleoxy Polysilicate $$HO\left[\begin{array}{c}O_2C-C_{17}H_{33}\\|\\-Si-O-\\|\\OC_4H_9\end{array}\right]_xH$$ | liquid | | sol | sol | Insol | Insol |
| 14 | Butoxy Stearoxy Polystannate $$HO\left[\begin{array}{c}O_2C-C_{17}H_{35}\\|\\-Sn-O-\\|\\OC_4H_9\end{array}\right]_xH$$ | liquid | | sol | sol | s.sol | Insol |

The following are typical illustrations of the preparation of metal aminoalcohol derivatives:

EXAMPLE 15

*Diethoxy-di-(diethanolaminoethoxy)-silicate*

In a 1-liter, round-bottomed flask fitted with a moisture receiver and a reflux condenser, were placed 208 g. (1 mol) of tetraethyl orthosilicate and 298 g. (2 mol) of triethanolamine. The solution is heated until 118 mls. (92 g., 2 mol) of ethanol was caught in the trap. The solution was cooled and the flask was hooked up to a vacuum system to remove the last traces of ethanol from the solution. Four hundred g. (97 percent of the theoretical amount) of diethoxy-di-(diethanolaminoethoxy)-silicate as a light amber-colored liquid was obtained.

| | Found | Calculated |
|---|---|---|
| Percent N | 6.43 | 6.52 |
| Percent Si | 6.38 | 6.52 |

EXAMPLE 16

*Diethoxy-di-(diethanolaminoethoxy)-silicate-N-oleate*

In a 250 ml. Erlenmeyer flask were placed 41.4 g. (0.1 mol) of diethoxy-di-(diethanolaminoethoxy)-silicate and 28.2 g. (0.1 mol) of oleic acid. The flask was stoppered and shaken for 15 minutes during which time the contents of the flask warm up owing to the exothermic nature of the reaction. The flask was removed from the shaker and warmed on a hot plate for 15 minutes to complete the reaction. A quantitative yield of diethoxy-di-(diethanolaminoethoxy)-silicate-N-oleate was obtained in the form of a light red oil, freely soluble in water.

| | Found | Calculated |
|---|---|---|
| Percent C | 57.2 | 58.7 |
| Percent H | 10.41 | 10.45 |

EXAMPLE 17

*Diethoxy-di-(diethanolaminoethoxy)-silicate-N, N-dioleate*

This compound was prepared by the same procedure as that employed for the synthesis of diethoxy-di-(diethanolaminoethoxy)-silicate-N-oleate, employing 41.4 g. (0.1 mol) of diethoxy-di-(diethanolaminoethoxy)-silicate and 56.4 g. (0.2 mol) of oleic acid.

Examples 18 to 44 inclusive consist of similar compounds prepared as indicated above. Their physical properties are given in Table II below.

TABLE II

| No. | Compound | Appearance | M.P. | Solubility in | | | |
|---|---|---|---|---|---|---|---|
| | | | | Hexane | CCl$_4$ | C$_2$H$_5$OH | H$_2$O |
| 18 | Diethoxy-di-(triethanolamine)-silicate (C$_2$H$_5$O)$_2$Si[OC$_2$H$_4$N(C$_2$H$_4$OH)$_2$]$_2$ | liquid | | Insol | sol | sol | sol |
| 19 | Dibutoxy-di-(triethanolamine)-silicate (C$_4$H$_9$O)$_2$Si[OC$_2$H$_4$N(C$_2$H$_4$OH)$_2$]$_2$ | liquid | | Insol | sol | sol | sol |
| 20 | Diisopropoxy-di-(triethanolamine)-silicate (C$_3$H$_7$O)$_2$Si[OC$_2$H$_4$N(C$_2$H$_4$OH)$_2$]$_2$ | liquid | | Insol | sol | sol | sol |
| 21 | Diethoxy-di-(β-diethylaminoethoxy)-silicate (C$_2$H$_5$O)$_2$Si[OC$_2$H$_4$N(C$_2$H$_5$)$_2$]$_2$ | liquid | | Insol | sol | sol | sol |
| 22 | Diethoxy-di-(triethanolamine)-plumbate (C$_2$H$_5$O)$_2$Pb[OC$_2$H$_4$N(C$_2$H$_4$OH)$_2$]$_2$ | solid | Dec | Insol | sol | sol | sol |
| 23 | Diethoxy-di-(triethanolamine)-stannate (C$_2$H$_5$O)$_2$Sn[OC$_2$H$_4$N(C$_2$H$_4$OH)$_2$]$_2$ | solid | Dec | Insol | sol | sol | sol |
| 24 | Diethoxy-di-(triethanolamine)-silicate-N-oleate (C$_2$H$_5$O)$_2$Si[OC$_2$H$_4$N(C$_2$H$_4$OH)$_2$]$_2$.HO$_2$C—C$_{17}$H$_{35}$ | liquid | | sol | sol | sol | sol |
| 25 | Diethoxy-di-(triethanolamine)-silicate-N,N-dioleate (C$_2$H$_5$O)$_2$Si[OC$_2$H$_4$N(C$_2$H$_4$OH)$_2$]$_2$.2HO$_2$CC$_{17}$H$_{35}$ | liquid | | sol | sol | sol | sol |
| 26 | Diisopropoxy-di-(triethanolamine)-silicate-N-oleate (C$_3$H$_7$O)$_2$Si[OC$_2$H$_4$N(C$_2$H$_4$OH)$_2$]$_2$.HO$_2$C—C$_{17}$H$_{35}$ | liquid | | sol | sol | sol | sol |
| 27 | Diisopropoxy-di-(triethanolamine)-silicate-N,N-dioleate (C$_3$H$_7$O)$_2$Si[OC$_2$H$_4$N(C$_2$H$_4$OH)$_2$]$_2$.2HO$_2$C—C$_{17}$H$_{35}$ | liquid | | sol | sol | sol | sol |
| 28 | Dibutoxy-di-(triethanolamine)-silicate-N-oleate (C$_4$H$_9$O)$_2$Si[OC$_2$H$_4$N(C$_2$H$_4$OH)$_2$]$_2$.HO$_2$C—C$_{17}$H$_{35}$ | liquid | | sol | sol | sol | sol |
| 29 | Dibutoxy-di-(triethanolamine)-silicate-N,N-dioleate (C$_4$H$_9$O)$_2$Si[OC$_2$H$_4$N(C$_2$H$_4$OH)$_2$]$_2$.2HO$_2$C—C$_{17}$H$_{35}$ | liquid | | sol | sol | sol | sol |
| 30 | Dibutoxy-di-(β-diethylaminoethoxy)-silicate-N-oleate (C$_4$H$_9$O)$_2$Si[OC$_2$H$_4$N(C$_2$H$_4$OH)$_2$]$_2$.HO$_2$C—C$_{17}$H$_{35}$ | liquid | | sol | sol | sol | sol |
| 31 | Diethoxy-di-(β-diethylaminoethoxy)-silicate-N-oleate (C$_2$H$_5$O)$_2$Si[OC$_2$H$_4$N(C$_2$H$_5$)$_2$]$_2$.HO$_2$C—C$_{17}$H$_{35}$ | liquid | | sol | sol | sol | sol |

TABLE II—Continued

| No. | Compound | Appearance | M.P. | Solubility in | | | |
|---|---|---|---|---|---|---|---|
| | | | | Hexane | CCl₄ | C₂H₅OH | H₂O |
| 32 | Diethoxy-di-(β-diethylaminoethoxy)-silicate-N,N-dioleate $(C_2H_5O)_2Si[OC_2H_4N(C_2H_5)_2]_2.2HO_2C-C_{17}H_{33}$ | liquid | | sol | sol | sol | sol. |
| 33 | Diethoxy-di-(triethanolamine)-plumbate-N,N-dioleate $(C_2H_5O)_2Pb[OC_2H_4N(C_2H_4OH)_2]_2.2HO_2C-C_{17}H_{33}$ | liquid | | sol | sol | sol | sol. |
| 34 | Diethoxy-di-(triethanolamine)-stannate-N,N-dioleate $(C_2H_5O)_2Sn[OC_2H_4N(C_2H_4OH)_2]_2.2HO_2C-C_{17}H_{33}$ | liquid | | sol | sol | sol | sol. |
| 35 | Diethoxy-di-(triethanolamine)-stannate-N-oleate $(C_2H_5O)_2Sn[OC_2H_4N(C_2H_4OH)_2]_2.HO_2C-C_{17}H_{33}$ | liquid | | Insol | sol | sol | sol. |
| 36 | Dibutoxy-di-(β-diethylaminoethoxy)-silicate-N,N-dioleate $(C_4H_9O)_2Si[OC_2H_4N(C_2H_5)_2]_2.2HO_2C-C_{17}H_{33}$ | liquid | | sol | sol | sol | sol. |
| 37 | Diethoxy-di-(diethanolamine)-silicate $(C_2H_5O)_2Si[OC_2H_4NH(C_2H_4OH)_2]_2$ | liquid | | Insol | sol | sol | sol. |
| 38 | Diethoxy-di-(diethanolamine)-silicate-N-oleate $(C_2H_5O)_2Si[OC_2H_4NH(C_2H_4OH)_2]_2.HO_2C-C_{17}H_{33}$ | liquid | | s.sol | sol | sol | sol. |
| 39 | Diethoxy-di-(diethanolamine)-silicate-N,N-dioleate $(C_2H_5O)_2Si[OC_2H_4NH(C_2H_4OH)_2]_2.2HO_2C-C_{17}H_{33}$ | liquid | | sol | sol | sol | sol. |
| 40 | Tetra-(triethanolamine)-silicate $Si[OC_2H_4N(C_2H_4OH)_2]_4$ | liquid | | s.sol | sol | sol | sol. |
| 41 | Di-(triethanolamine)-silicate $Si[(OC_2H_4)_2NC_2H_4OH]_2$ | liquid | | s.sol | sol | sol | sol. |
| 42 | Di-(triethanolamine)-silicate-N,N-dioleate $Si[(OC_2H_4)_2NC_2H_4OH]_2.2HO_2C-C_{17}H_{33}$ | liquid | | s.sol | sol | sol | sol. |
| 43 | Diethoxy-di-(triisopropanolamine)-silicate $(C_2H_5O)_2Si\left[O-CH_2-\underset{CH_3}{CH}-N(CH-\underset{CH_3}{CH}-OH)_2\right]_2$ | liquid | | s.sol | sol | sol | sol. |
| 44 | Diethoxy-di-(triisopropanolamine)-silicate-N-oleate $(C_2H_5O)_2Si\left[OCH_2-\underset{CH_3}{CH}-N(CH_2-\underset{CH_3}{CH}-OH)_2\right]_2.HO_2C-C_{17}H_{33}$ | liquid | | s.sol | sol | sol | sol. |

The following examples indicate typical preparations of metal polyhydric alcohol derivatives.

EXAMPLE 45

*Diethoxy-di-(2-ethyl-3-hydroxy-n-hexoxy)-silicate*

In a 300 ml. round-bottomed flask equipped with a moisture receiver and a reflux condenser, were placed 52 g. (0.25 mol) of ethyl orthosilicate and 73 g. (0.5 mol) of 2-ethyl-hexanediol-1,3. The contents of the flask were heated until 29.2 ml. (23 g., 0.5 mol) of ethanol was caught in the trap. The contents were cooled and the flask was attached to a vacuum system to remove the last traces of ethanol. A quantitative yield of the glycol derivative, which was a colorless water-insoluble oil, was obtained.

| | Found | Calculated |
|---|---|---|
| Percent Si | 6.82 | 6.85 |
| Percent C | 60.7 | 61.2 |
| Percent H | 10.2 | 10.8 |

Examples 46 to 57 inclusive consist of similar compounds prepared precisely as indicated above. (Their physical properties are given in Table III below.)

TABLE III

| No. | Compound | Appearance | M.P. | Solubility in | | | |
|---|---|---|---|---|---|---|---|
| | | | | Hexane | CCl₄ | EtOH | H₂O |
| 46 | Tetra-(2-ethylhexanediol-1,3)-silicate $Si(O-CH_2-\underset{C_2H_5}{CH}-\underset{OH}{CH}-C_3H_7)_4$ | liquid | | sol | sol | sol | Insol. |
| 47 | Isopropoxy-tri-(2-ethylhexanediol)-silicate $C_3H_7OSi(O-CH_2-\underset{C_2H_5}{CH}-\underset{OH}{CH}-C_3H_7)_3$ | liquid | | sol | sol | sol | Insol. |
| 48 | Diisopropoxy-di-(2-ethylhexanediol-1,3)-silicate $(C_3H_7O)_2Si(OCH_2-\underset{C_2H_5}{CH}-\underset{OH}{CH}-C_3H_7)_2$ | liquid | | sol | sol | sol | Insol. |
| 49 | Ethoxy-tri-(2-ethylhexanediol-1,3)-silicate $(C_2H_5O)_3Si(OCH_2-\underset{C_2H_5}{CH}-\underset{OH}{CH}-C_3H_7)$ | liquid | | sol | sol | sol | Insol. |
| 50 | Diisopropoxy-di-(2-ethylhexanediol-1,3)-stannate $(C_3H_7O)_2Sn(OCH_2-\underset{C_2H_5}{CH}-\underset{OH}{CH}-C_3H_7)_2$ | liquid | | sol | sol | sol | Insol. |

TABLE III—Continued

| No. | Compound | Appearance | M.P. | Solubility in Hexane | Solubility in CCl₄ | Solubility in EtOH | Solubility in H₂O |
|---|---|---|---|---|---|---|---|
| 51 | Di-(triethoxysiloxy)-glyceryl oleate<br>[(C₂H₅O)₃SiOCH₂]₂CHO₂C—C₁₇H₃₃ | liquid | | sol | sol | sol | Insol. |
| 52 | Tri-(triethoxysiloxy)-pentaerythrityl oleate<br>[(C₂H₅O)₃SiOCH₂]₃C—CH₂O₂C—C₁₇H₃₃ | liquid | | sol | sol | sol | Insol. |
| 53 | Di-(triethoxysiloxy)-pentaerythrityl dioleate<br>[(C₂H₅O)₃SiOCH₂]₂—C—(CH₂O₂C—C₁₇H₃₃)₂ | liquid | | sol | sol | sol | Insol. |
| 54 | Diisopropoxy-di-(pentanediol-1,5)-silicate<br>(C₃H₇O)₂Si[O(CH₂)₅OH]₂ | liquid | | sol | sol | sol | Insol. |
| 55 | 1:1-triethanolamine-ethyl orthosilicate copolymer<br>$C_2H_5O\left[\begin{array}{c}OC_2H_5\\-Si-O-C_2H_4NC_2H_4-O-\\OC_2H_5\quad C_2H_4OH\end{array}\right]_xH$ | liquid | | sol | sol | sol | Insol. |
| 56 | 1:1-ethyl orthosilicate-2-ethylhexanediol-1,3<br>$C_2H_5O\left[\begin{array}{c}OC_2H_5\quad C_2H_5\\-Si-O-CH_2-CH-CHO-\\OC_2H_5\quad C_3H_7\end{array}\right]_x$ | liquid | | sol | sol | sol | Insol. |
| 57 | Di-(triethanolamine)-silicate-N,N-dioleate<br>Si[(OC₂H₄)₂NC₂H₄OH]₂·2HO₂C—C₁₇H₃₃ | liquid | | sol | sol | sol | Insol. |

Generally speaking, the compounds of the invention have a marked effect on the grinding and dispersing characteristics of pigments in conventional vehicles. Such effects can be illustrated by a simple test featuring one of these compounds. In this test procedure two suspensions were prepared by adding 10 grams of cadmium sulfide pigment to 90 grams of kerosene. Four grams of isopropoxy stearoxy polystannate were added to one of the suspensions, and both suspensions were shaken separately for ten minutes. The suspension of cadmium sulfide in kerosene settled immediately, and was settled completely in one minute. On the other hand, the suspension of cadmium sulfide in the kerosene solution containing the compound of the invention remained in suspension from five to eight hours before completely settling, and even then could be redispersed by slight agitation.

The dispersing ability of the compounds of the invention and their usefulness as grinding aids were evaluated using two types of pigment: titanium dioxide and a synthetic pyrazolone red organic pigment. A modified alkyd resin was used as the vehicle in each case.

A mechanical mixer was employed in these dispersion tests, which mixer is essentially an accelerated ball mill employing ¼ inch steel ball bearings as the grinding elements. The test procedure consisted of charging this mixer with 200 to 300 ml. of pigment vehicle mixture containing 1 percent by weight of the dispersant. Mixing was initiated, and at ten minutes intervals small samples were taken from the dispersion. These small samples were placed on a Hegman gauge to determine the fineness of grind. This instrument, as is well known, is a steel plate containing an inclined impression, 0.005 inch deep at one end, and 0 inch deep at the other end. The composition to be tested is placed in the deep end, and a knife is drawn over the specimen to form a wedge of paint. By viewing the gauge under the proper light, coarse particles can be seen breaking through the paint film surface. The instrument is provided with a linear scale beginning with 0 at the point where the channel is 0.004 inch deep, and going to 8 where the channel is 0 inch deep. The point where particles break through the film is noted on the scale, and the reading on the scale at this point is a measure of the fineness of the grind.

Using the test procedure indicated above, the dispersing ability of the compounds of the invention were compared with those of conventional dispersants having a dioctyl sodium sulfosuccinate base.

The fineness values obtained on the Hegman gauge were plotted on graph paper against the time of grinding of the samples. Curves obtained for each paint composition are given in FIGS. 1 and 2.

FIG. 1 represents data obtained by dispersing titanium dioxide in an alkyd resin. The charge tested had the following composition:

```
                                                    Grams
Titanium dioxide _____ 150
Alkyd resin _____ 147
Dispersant _____   3
```

The data of FIG. 1 indicate that the dispersants of the invention, namely di(tri-ethoxy)-glyceryl oleate, butoxy stearoxy polysilicate and di-butoxy-di(triethanolamine)-silicate-N,N-oleate are more effective as dispersants for this pigment vehicle composition than the dioctyl sodium sulfosuccinate-based commercial dispersant A and B and dispersants C.

Not only did the compounds of the invention give a better dispersion as indicated by the Hegman gauge, but they dispersed the titanium dioxide much more rapidly in the vehicle than did the prior art dispersants. Thus a blank test sample containing no dispersant required 30 minutes of grinding to reach a fineness of 6.5 using one part of prior art dispersant "A" per 100 parts of pigment vehicle mixture. The grinding time required to reach a fineness of 6.5 was 25.6 minutes. However, using one part of the dispersants of the invention per 100 parts of mix reduced the grinding time to 23 minutes, representing a reduction of 7 minutes or of 23 percent in the overall grinding time. For this composition, therefore, use of the dispersants of the invention can cut the time of dispersion by an additional 9 percent over the percent decrease observed through the use of prior art dispersants.

Figure 2:
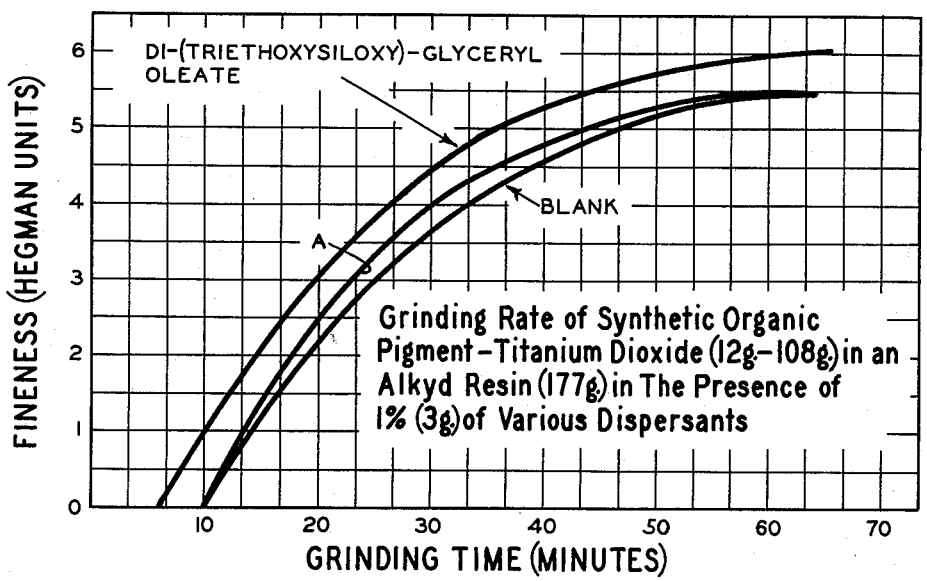

The plot of FIG. 2 shows the change of fineness with grinding time of paints containing 10 percent of a synthetic organic red pigment. The composition contained the following ingredients:

```
                                                    Grams
Titanium dioxide _____ 108
Synthetic organic red pigment _____  12
Alkyd resin _____ 177
Dispersant _____  13
```

The plot shows that the dispersant of the invention, di-(triethoxy siloxy)-glyceryl oleate, is much more effective in dispersing the pigment mixture in its vehicle than is prior art dispersant A. Thus after 65 minutes both the blank sample and the sample containing dispersant A reached a fineness of 5.5, while the sample containing the dispersant of the invention gave a fineness of 6 at the end of the same grinding period. The same sample attained a fineness of 5.5 in 43 minutes, whereas the blank and sample A required 65 minutes to reach this fineness. This difference of 22 minutes represents a 34 percent decrease in the grinding time.

From the above examples it can be seen that the novel compositions of matter of the invention can provide a process for reducing the dispersion time of pigments in paints, varnishes and inks. Such a process comprises selecting at least one dispersant chosen from the organo metallic derivatives disclosed above, adding the same to a mixture of pigment and pigment-suspending vehicle in an amount sufficient to reduce the dispersion time of the pigments in the pigment-suspending vehicle by a percentage factor of from 9 percent to 34 percent, with the upper weight limit of said dispersant being about 5 percent of the total pigment and pigment vehicle composition.

Many pigments other than the ones mentioned in the above examples can be dispersed rapidly and thoroughly in various organic pigment vehicles by means of the dispersants of the invention.

The compounds of the invention are operative in conventional organic pigment vehicles including kerosene, terpenes, xylenes, natural and synthetic resins, such as alkyd, phenolic resins and oleoresins, to mention only a few.

In addition to reducing the dispersion time of pigments in their media, the dispersants of the invention result in a better quality end product, whether this product be a paint, lacquer, pigmented-varnish or ink. This is due to the fact that the presence of these compounds causes a retention of the uniform dispersion of the pigment in its media. In turn, such uniform dispersion results in excellent consistency of the finished product.

It should be appreciated that the compositions above described are in no way intended to be limited as to their components, including their pigments and organic vehicles, since all of the constituents are well known in the prior art with the exception of the new use of the dispersants of the invention.

What is claimed is:

1. A pigment-containing composition comprising a pigment and a medium therefor, said medium being selected from the group consisting of alkyd resins, phenolic resins and oleoresins, and from about 0.1 percent by weight thereof to about 5 percent of a dispersant selected from the group consisting of:

(a) metal carboxylates having the formula

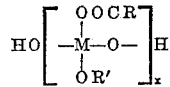

wherein M is a metal selected from the group consisting of silicon, tin and lead, R is an organic group selected from the class consisting of the aryl, alkaryl, aralkyl, alkyl and haloalkyl radicals having from 10 to 18 carbon atoms, R' is an organic group selected from the class consisting of the aryl, alkaryl, aralkyl, alkyl and haloalkyl radicals having from 1 to 18 carbon atoms and $x$ is a number from 1 to 3;

(b) metal amino alcohol derivatives having the formula

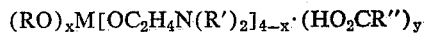

wherein M is a metal selected from the group consisting of silicon, tin and lead, R and R' are organic groups selected from the class consisting of the aryl, alkaryl, aralkyl, alkyl and haloalkyl radicals having from 1 to 18 carbon atoms, R" is an organic group selected from the class consisting of the aryl, alkaryl, aralkyl, alkyl and haloalkyl radicals, having from 10 to 18 carbon atoms, $x$ is a number from 0 to 3; and $y$ is a number having a maximum value equal to $4-x$; and (c) metal polyhydric derivatives having the formula

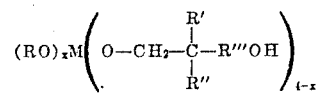

wherein M is a metal selected from the group consisting of silicon, tin and lead, R is an organic group selected from the class consisting of the aryl, alkaryl, alkyl and haloalkyl radicals having from 1 to 18 carbon atoms, R' is an organic group selected from the class consisting of hydrogen, alkyl, hydroxyl and haloalkyl radicals, R" is an organic group selected from the class consisting of hydrogen and the alkyl and haloalkyl radicals, R''' is an organic group selected from the class consisting of the alkylene and substituted alkylene radicals, and $x$ is a number from 1 to 3.

2. A metal carboxylate having the formula:

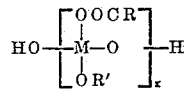

wherein M is a metal selected from the group consisting of silicon, tin and lead, R is an organic group selected from the class consisting of the aryl, alkaryl, aralkyl, alkyl and haloalkyl radicals having from 10 to 18 carbon atoms, R' is an organic group selected from the class consisting of the aryl, alkaryl, aralkyl, alkyl and haloalkyl radicals having from 1 to 18 carbon atoms and $x$ is a number from 1 to 3.

3. A metal amino alcohol derivative having the formula:

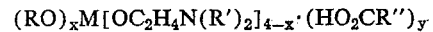

wherein M is a metal selected from the group consisting of silicon, tin and lead, R and R' are organic groups selected from the class consisting of the aryl, alkaryl, aralkyl, alkyl and haloalkyl radicals having from 1 to 18 carbon atoms, R" is an organic group selected from the class consisting of the aryl, alkaryl, aralkyl, alkyl and haloalkyl radicals having from 10 to 18 carbon atoms, $x$ is a number from 0 to 3; and $y$ is a number having a maximum value equal to $4-x$.

4. A metal polyhydric derivative having the formula:

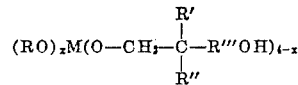

wherein M is a metal selected from the group consisting of silicon, tin and lead, R is an organic group selected from the class consisting of the aryl, alkaryl, alkyl and haloalkyl radicals having from 1 to 18 carbon atoms, R' is an organic group selected from the class consisting of hydrogen, alkyl, hydroxyl and haloalkyl radicals, R" is an organic group selected from the class consisting of hydrogen and the alkyl and haloalkyl radicals, R''' is an organic group selected from the class consisting of the alkylene and substituted alkylene groups, and $x$ is a number from 1 to 3.

5. A paint composition comprising a pigment and an organic vehicle selected from the group consisting of the alkyd resins, the phenolic resins and the oleoresins, and from about 0.1 percent to about 5 percent by weight thereof of an alkoxy stearoxy polystannate.

References Cited in the file of this patent

UNITED STATES PATENTS

| | | |
|---|---|---|
| 2,490,691 | Langkammerer | Dec. 6, 1949 |
| 2,584,351 | Hunter et al. | Feb. 5, 1952 |
| 2,615,006 | Lane | Oct. 21, 1952 |
| 2,621,194 | Balthis | Dec. 9, 1952 |
| 2,621,195 | Haslam | Dec. 9, 1952 |
| 2,634,285 | Rust et al. | Apr. 7, 1953 |
| 2,637,711 | Auer | May 5, 1953 |
| 2,708,203 | Haslam | May 10, 1955 |

UNITED STATES PATENT OFFICE
Certificate of Correction

Patent No. 2,989,412                                                 June 20, 1961

James O. Koehler et al.

It is hereby certified that error appears in the above numbered patent requiring correction and that the said Letters Patent should read as corrected below.

Columns 3 and 4, TABLE I, second column thereof, the formula of compound 5 should appear as shown below instead of as in the patent:

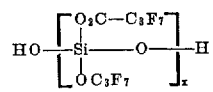

same TABLE I, second column thereof, the formula of compound 6 should appear as shown below instead of as in the patent:

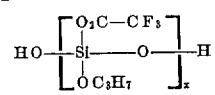

same TABLE I, second column thereof, the formula of compound 7 should appear as shown below instead of as in the patent:

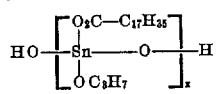

same TABLE I, second column thereof, the formula of compound 8 should appear as shown below instead of as in the patent:

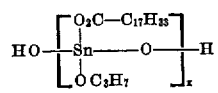

same TABLE I, second column thereof, the formula of compound 9 should appear as shown below instead of as in the patent:

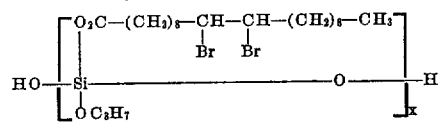

column 10, line 42, for "-N,N-oleate" read— -N,N-di-oleate —.

Signed and sealed this 14th day of November 1961.

[SEAL]

Attest:
ERNEST W. SWIDER,
*Attesting Officer.*

DAVID L. LADD,
*Commissioner of Patents.*